United States Patent [19]

Double et al.

[11] Patent Number: 4,897,970
[45] Date of Patent: Feb. 6, 1990

[54] METHOD OF COVERING AND SECURING MATERIAL

[75] Inventors: Paul B. Double; Frederick W. Orr, both of Winona, Minn.; Robert E. Dotterwick, Fountain City, Wis.

[73] Assignee: Canamer International, Inc., Winona, Minn.

[21] Appl. No.: 234,016

[22] Filed: Aug. 18, 1988

[51] Int. Cl.$^4$ ............................................... E04D 1/34
[52] U.S. Cl. ............................................... 52/4; 52/3
[58] Field of Search ................ 52/3, 4, 5, 23, 63, 52/83, DIG. 9; 428/223

[56] References Cited

U.S. PATENT DOCUMENTS

| | | | |
|---|---|---|---|
| 2,635,562 | 4/1953 | Abramson | 52/3 |
| 2,730,150 | 1/1956 | Wunderwald et al. | 150/5 |
| 3,416,762 | 2/1967 | Headrick | 248/361 |
| 3,678,542 | 7/1972 | Prete, Jr. | 24/170 X |
| 3,949,527 | 4/1976 | Double et al. | 52/4 |
| 4,084,358 | 4/1978 | Winters | 52/4 |
| 4,122,637 | 10/1978 | Runge et al. | 52/3 |
| 4,413,029 | 11/1983 | Handwerker | 428/192 X |
| 4,455,790 | 6/1984 | Curle | 52/4 |
| 4,627,333 | 12/1986 | Anderson et al. | 98/56 |
| 4,660,337 | 4/1987 | Ross, III et al. | 52/192 |
| 4,726,286 | 2/1988 | Anderson et al. | 98/56 |

OTHER PUBLICATIONS

Supplemental Declaration of Frederick W. Orr, dated 1/13/89.

Primary Examiner—David A. Scherbel
Assistant Examiner—Creighton Smith
Attorney, Agent, or Firm—Kinney & Lange

[57] ABSTRACT

A method of securing and covering a windrow-shaped stack of material to the ground includes the steps of laying a cover sheet over the entire stack and placing ballast around the base of the stack over the edges of the cover sheet to hold the sheet down. A plurality of anchors pairs are positioned on opposite sides of the stack, with flat adjustable-length side straps secured laterally over the sides of the stack from side anchor to side anchor. Anchor pairs are also positioned along the sides of semi-circular ends of the base of the stack, with flat adjustable-length end straps secured laterally over the ends of the stack from end anchor to end anchor. In addition at least one second end strap is also secured lateral over the end of the stack, but is secured at its ends to the first opposed pair of side anchors along the sides of the stack. The side anchors and end anchors are each individually tightened down over the cover and stack to hold the cover in place, with the end straps aligned across the end of the stack to run perpendicularly to the slope of the stack.

11 Claims, 8 Drawing Sheets

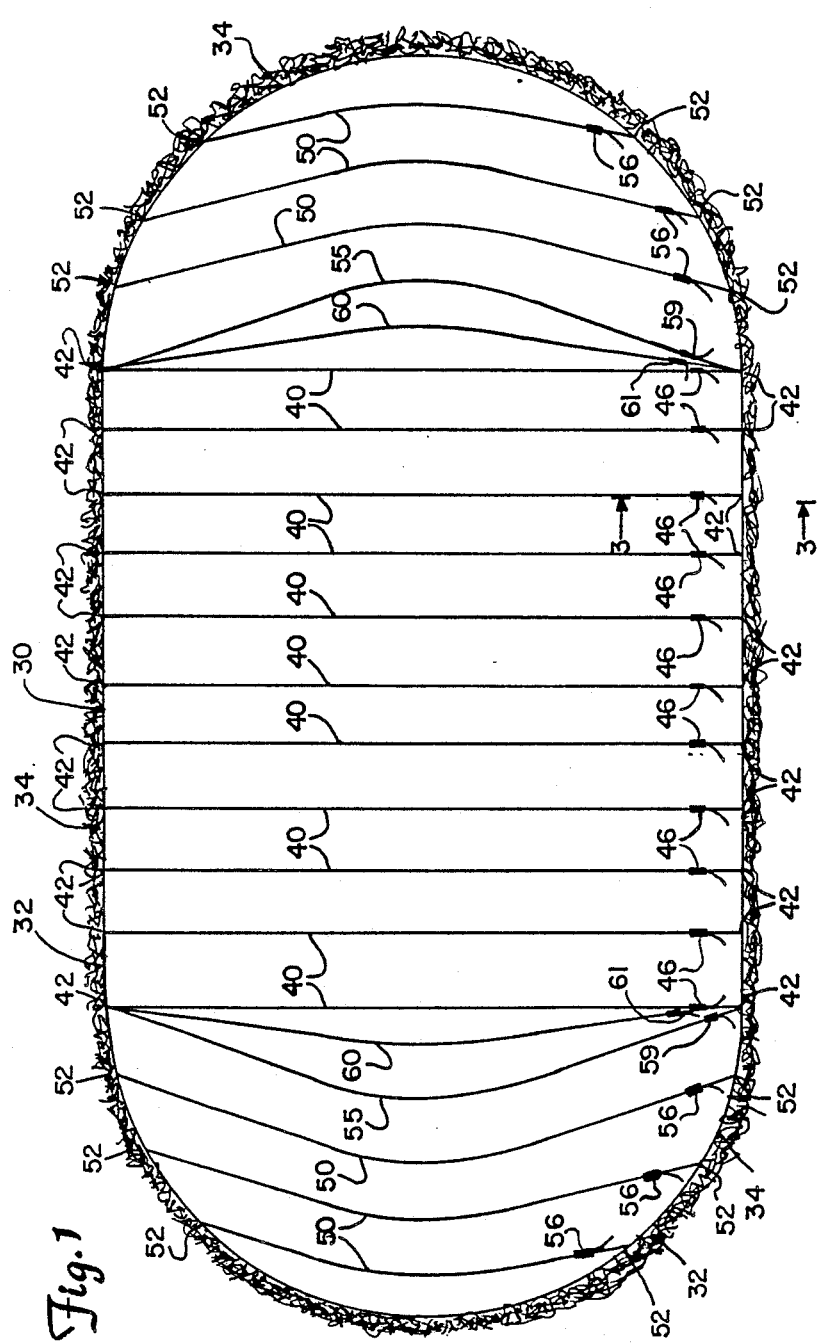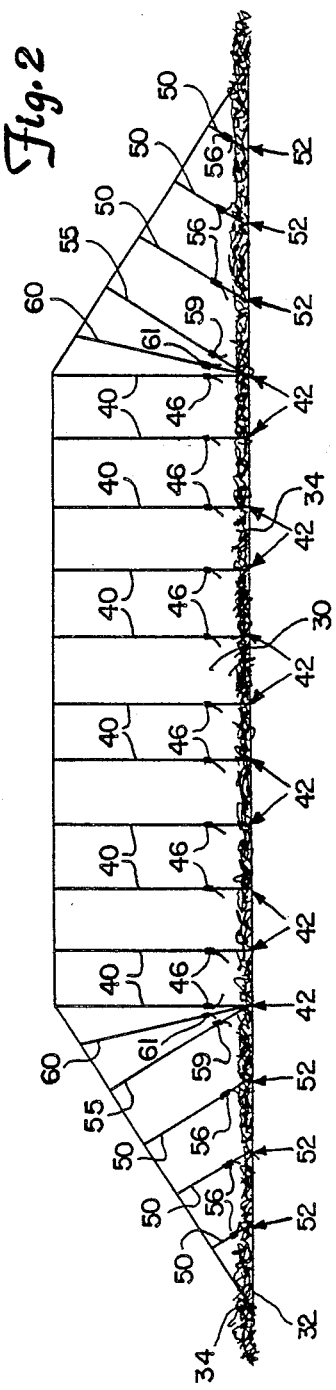

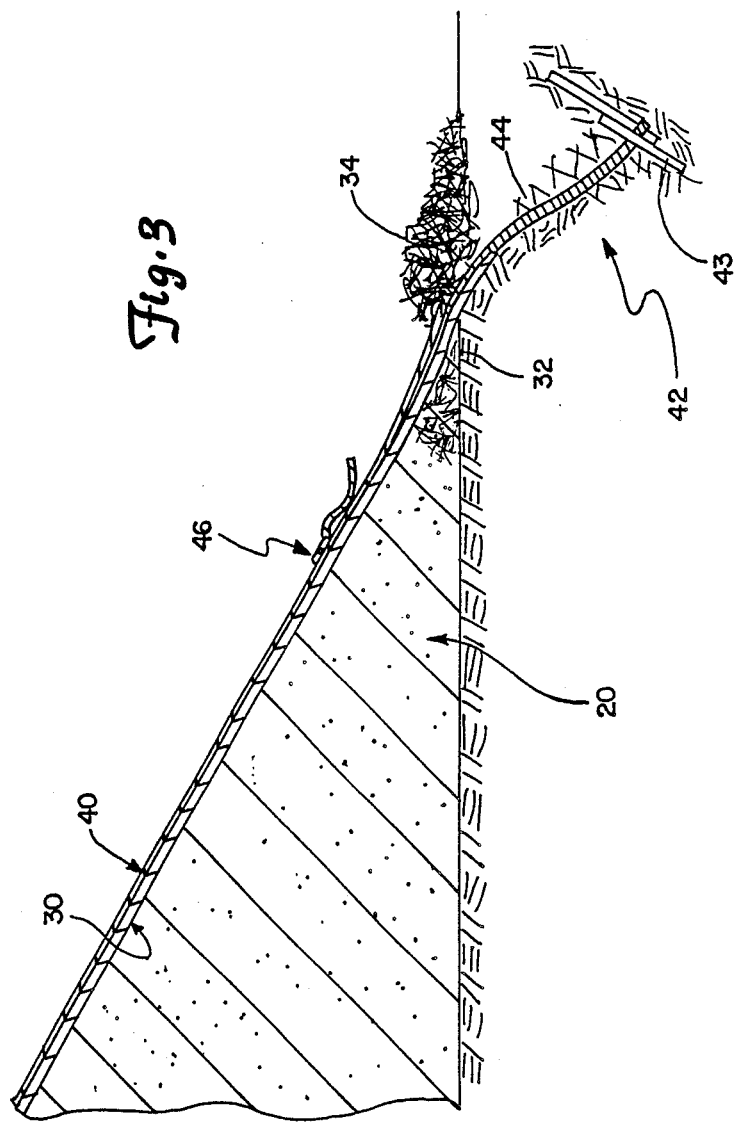

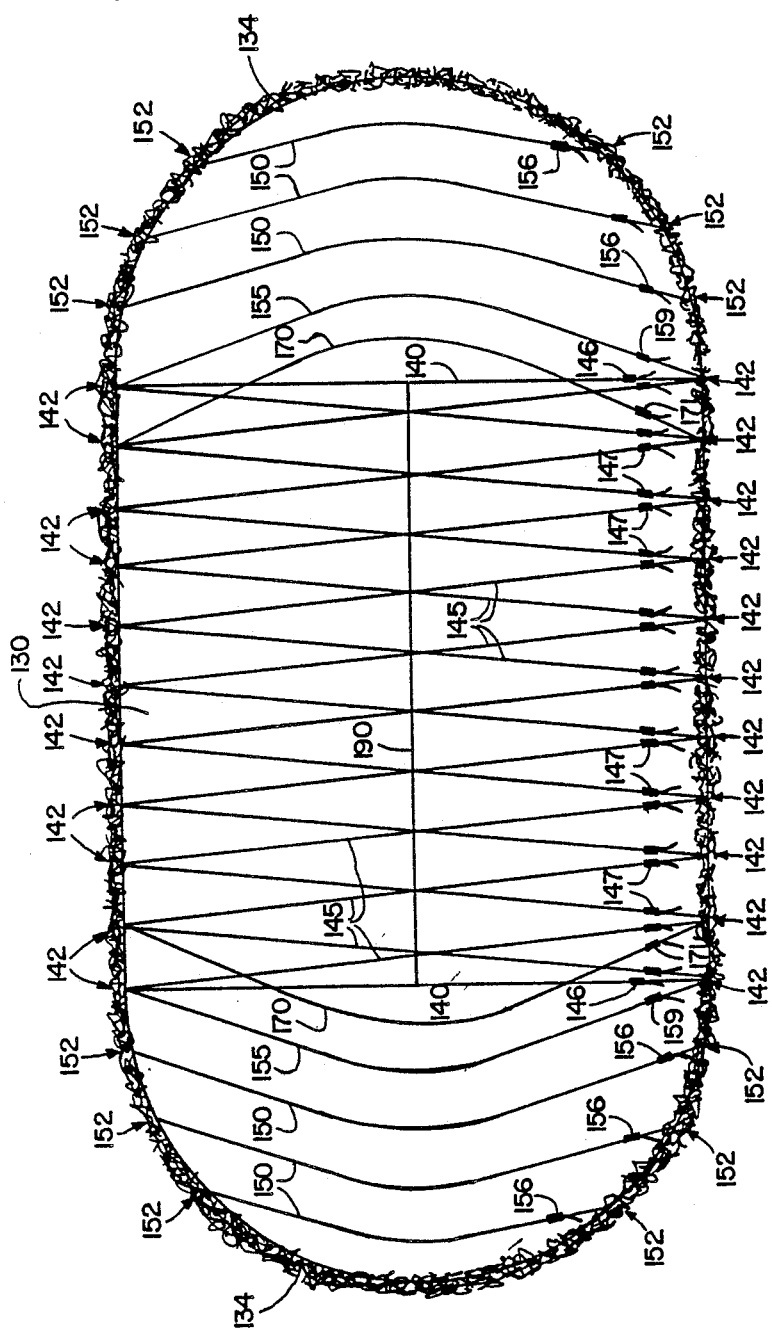
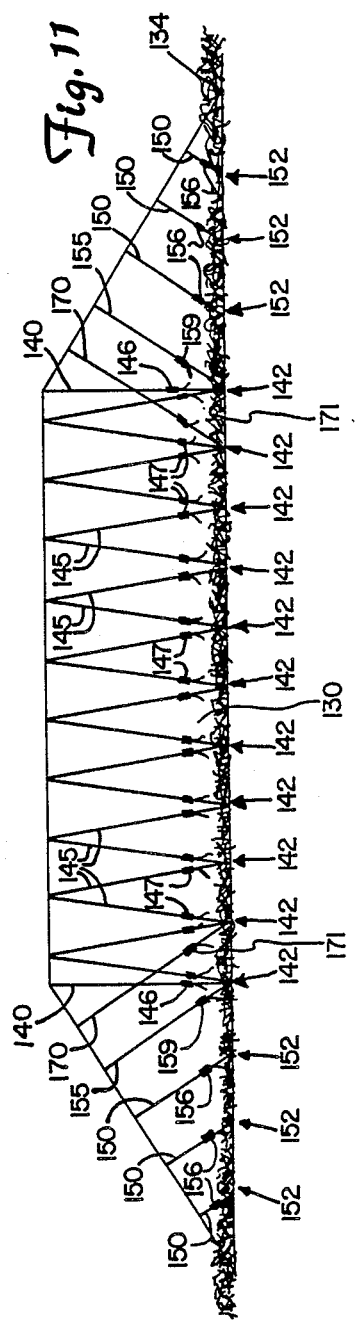

METHOD OF COVERING AND SECURING MATERIAL

BACKGROUND OF THE INVENTION

1. Field of the Invention

The present invention relates to a method for securing stacks of material to the ground, and specifically stacks of loose materials such as grain, salt, coal, etc., employing anchors about the edges of the material with a cover sheet held down by a series of straps secured between the anchors.

2. Description of the Prior Art

Numerous systems have been developed for covering piles of particulate material, such as sand, salt, grain, coal and the like. Such systems are intended to protect the covered material from the elements. For example, as can be readily appreciated, it is necessary when storing grain that the grain be kept under relatively controlled conditions with respect to moisture and temperature. As technology and industry has progressed, the quantities and varieties of materials which can be stored out of doors has greatly increased. Stacks of material such as salt, grain and packaged goods are often several hundred feet long and range up to fifty feet high.

One example of a cover system for protecting a large stack of material is disclosed in Double et al. U.S. Pat. No. 3,949,527, which is incorporated herein by reference. This patent discloses a cover system where a cover is retained over a stack of material by loose particulate piled upon the edge of the cover around the base of the stack, and an intertwined series of cables passing over the cover. The cables are held off of the cover material by a series of load distribution devices (old vehicle tires) which distribute any loading or binding of the cable on the cover, thereby reducing the possibility of the cable chaffing the cover and cutting a hole through it. Handerworker U.S. Pat. No. 4,413,029 shows another arrangement for covering a pile or stack of particulate material where old tires are used as ballast to hold the cover down upon the material stack. In Handerworker, the cover is not held down by a series of cables running over it, but rather has reinforcing webbing sewn directly into the cover at cover section seams.

While the particulate covering system shown in the Double et al. patent works generally well in practice, recent developments have made such arrangements impractical. In order to employ the covering scheme as disclosed in the Double et al. or Handerwork patents, a supply of old tires was needed for cover ballast. Such tires are becoming increasingly scarce as the capability to recycle them into worthwile materials has developed. In addition, environmental concerns have arisen regarding the use of such tires. Typically, a small pool of water is retained inside of an abandoned tire, which provides a breeding ground for mesquitos and other vermin. Further, the use of discarded tires (i.e., trash) is viewed by some as asthetically displeasing. For these reasons, resistence and obstacles have developed to the continued use of discarded tires in connection with systems for covering particulate material out of doors. The present invention was thus developed as an economically and environmentally workable alternative to material covering arrangemets which use old tires.

SUMMARY OF THE INVENTION

The present invention is directed to a method of covering and securing to the ground a generally windrow-shaped stack of material. In this instance, the stack of material has a longitudinal crest having first and second ends, a base having a perimeter defined by a pair of generally parallel first and second side edges and a pair of generally semicircular-shaped end edges, with longitudinal sides sloping downwardly and laterally outwardly from the crest toward the side edges of the base, and first and second ends sloping downwardly and radially outwardly from each respective end of the crest toward the end edges of the base. The inventive method includes the steps of covering the entire surface of the stack with a flexible cover sheet having a rim portion, extending the rim portion of the cover sheet around the ground surface surrounding the stack of material and then laying ballast material over substantially the entire length of the rim portion of the cover sheet. This forces the rim portion into generally abutting engagement with the ground and thus prevents the influx of wind and moisture under the cover sheet. A plurality of side anchors are established with respect to the ground, with the anchors longitudinal spaced generally uniformly along the side edges of the base and aligned in opposed laterally pairs on opposite sides of the stack of material. A plurality of adjustable length, generally flat side straps are then laid laterally over the sides of the stack of material, in generally parallel relation and across the crest thereof. The ends of each flat side strap are secured to the side anchors of a respective one of each of the opposed pairs of side anchors, and each flat side strap is shortened to tighten the flat side strap down onto the cover sheet over the sides and crest of the stack of material. A plurality of end anchors are also established with respect to the ground with the end anchors longitudinally spaced generally uniformly along the end edges of the base and aligned in opposed laterally pairs on opposite sides of the ends of the stack of material. A plurality of adjustable length generally flat first end straps are laid generally laterally over the ends of the stack of material. The ends of each flat first end strap are secured to the end anchors of a respective one of each of the opposed pairs of end anchors, and the length of each flat first end strap is shortened to tighten the flat first end strap down onto the cover sheet over the ends of the stack material. At least one adjustable length, generally flat second end strap is laid generally laterally over each end of the stack of material adjacent its respective end of the crest of the stack of material. The ends of each flat second end strap are secured to the side anchors of the first opposed pair of side anchors along each side edge of the base, and the length of each flat second end strap is shortened to tighten the flat second end strap down onto the cover sheet over the end of the stack of material adjacent its respective end of the crest of the stack of material.

In one embodiment of the invention, an adjustable length, generally flat third end strap is laid generally laterally over each end of the stack of material adjacent its respective end of the crest of the stack of material, the ends of each flat third end strap are secured to the side anchors of the second opposed pair of side anchors along each side edge of the base, and the length of each flat third end strap is shortened to tighten the flat third end strap down onto the cover sheet over the end of the stack of material adjacent its respective end of the crest of the stack of material, whereby the flat third end strap twice crosses at least one of the flat side straps.

When it is desirable to ventilate the stack of material, means for creating a down draft air flow through the stack of material from its sides toward its base is provided. In addition, means are preferrably provided to regulate the extent of air flow through different portions of the stack of material.

In another embodiment of the invention, the ends of each flat side strap are not secured to laterally opposed pairs of side anchors, but rather to alternatively opposed side anchors, with the side straps then crisscrossing across the stack of material proximate its crest.

BRIEF DESCRIPTION OF THE DRAWINGS

FIG. 1 is a top plan view of a covering and securing system for a stack of material, employing the inventive method of the present invention.

FIG. 2 is a side elevational view of the covering and securing system shown in FIG. 1.

FIG. 3 is a partial sectional view of the strap shortening and anchoring devices, as taken along lines 3—3 in FIG. 1.

FIG. 10 is a top plan view of a third embodiment of the covering and securing system of the present invention.

FIG. 11 is a side elevational view of the covering system shown in FIG. 10.

DETAILED DESCRIPTION OF THE PREFERRED EMBODIMENTS

Figure 4:
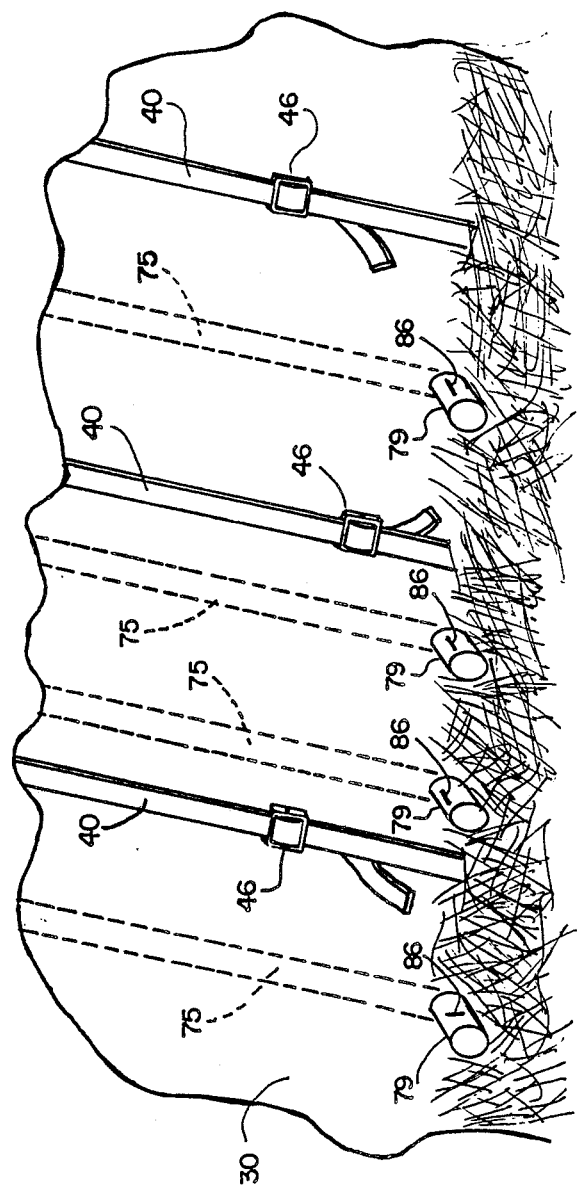
FIG. 4 is an enlarged, fragmentary perspective view of the portion of one side of the covering system illustrated in FIGS. 1 and 2, and showing the strap shortening devices.

FIGS. 1-11 show the various elements of the present invention and depict a method for covering and securing a stack of material 20 to the ground. It is understood that FIGS. 1-11 are exemplary and are not drawn to scale. The material being secured can be semi-fluid materials such as grain or salt, or can be packaged goods such as oil drums or cartons. The stack of material takes on different forms depending upon the nature of the material. If the material is a semi-fluid such as grain or salt, it will generally have the shaped shown in FIGS. 1 and 2, with a slope down the side of the stack of generally 25°-40°. With other types of material, the slopes of the stack sides will vary.

As shown, a stack of material will generally be formed in a windrow-shaped stack which has a longitudinal crest having first and second ends, a base having a perimeter defined by a pair of generally parallel side edges and a pair of generally semi-circular end edges. The longitudinal sides of the stack slope downwardly and laterally outwardly from the crest toward the side edges of the base, while the first and second ends of the stack slope downwardly and radially outwardly from each respective end of the crest toward the semi-circular end edges of the base. The stack of material is covered by a flexible cover sheet. The cover sheet protects the material thereunder from the elements (wind, snow, rain, etc.). While various sheet materials may be used for the cover sheet, the preferred sheet is formed of canvas, polyethylene, polycanvas or some other lightweight sheet material which is preferably water and gas impermeable. The unit weight of the cover sheet will also vary depending upon the material being covered, expected weather conditions and the projected life of the covering system. Such covering schemes are designed for use for extended periods of time, ranging from as several months to even several years.

A typical cover sheet is made up of several segments (not shown) of cover sheet material. These segments are typically sections of material which extend from side-to-side across the crest of the stack along its sides, and extend radially outwardly from the ends of the crest adjacent the ends of the stack. After such material sections are laid over the surface of the stack, their edges are joined together by sewing or other suitable means. In some embodiments, the edges are further sealed to effect an air and moisture tight seal. In this way, the cover sheet is laid out to cover and enclose the entire stack of material. When it is desired to move a portion of the stack of material, portions of the cover sheet can be rolled back or removed, with the remainder of the stack staying covered and undisturbed. Alternatively, the stack of material may be enlarged by adding more cover sections.

FIGS. 1-7

As seen in FIGS. 1 and 2, a cover sheet 30 is laid over a stack of material 20, with a rim portion 32 of the cover sheet extending around the perimeter of the base of the stack of material, and adjacent the ground surface of the stack. To hold down the rim portion 32 and prevent rain, snow or wind from entering underneath the cover sheet 30, various ballast materials are laid over essentially the entire length of the rim portion 32 of the cover sheet 30. Materials suitable for use as such ballast 34 include sand, pea gravel, tires, etc. Essentially, any material which can weight down the rim portion 32 of the cover sheet 30 will suffice as the necessary ballast material 34, depending upon availability of such ballast materials and the nature of the product comprising the stack of material.

Figure 8:
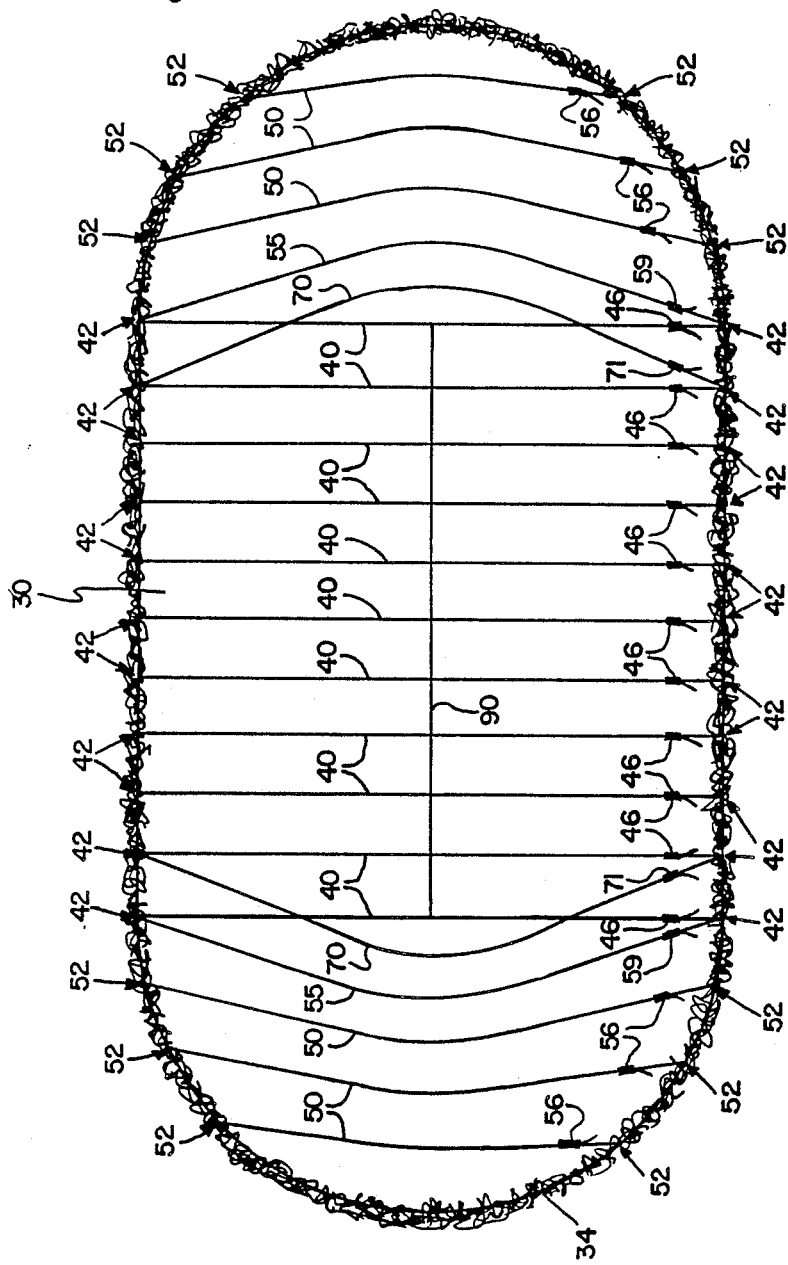
FIG. 8 is a top plan view of a second embodiment of the covering and securing system of the present invention.
Figure 9:
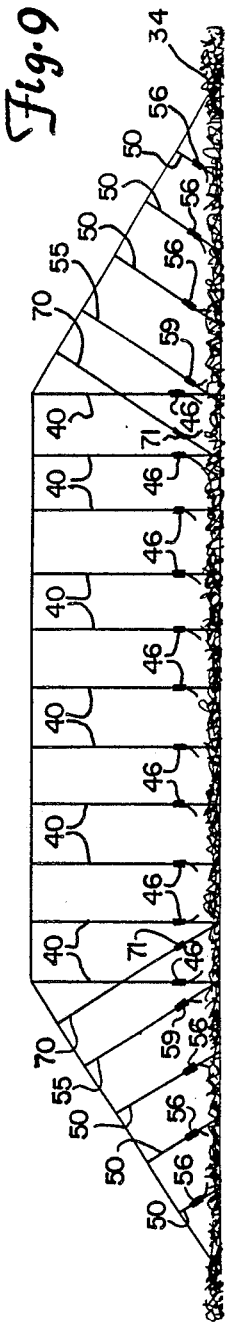
FIG. 9 is a side elevational view of the covering system shown in FIG. 8.

To hold the cover sheet 30 tightly down over the stack of material 20, a plurality of flat webbing straps are secured over the cover sheet 30. Preferably, such straps are polyester or nylon webbing straps having a breaking strength of ranging from 4600 pounds to 9900 pounds. The ends of the straps are secured adjacent the edges of the base of the stack of material, and each strap is individually tightened down over the cover sheet 30 and stack of material 20, as further described below. One particular arrangement for the straps is shown in FIGS. 1-7, while a second arrangement is shown in FIGS. 8 and 9, and a third arrangement shown in FIGS. 10 and 11.

Referring to FIGS. 1 and 2, the covering system of the invention method utilizes a series of laterally-extending flat side straps, each designated by the numeral 40, which extend across the middle or windrow portion of the material stack 20, generally parallel to one another and across the crest of the stack.

The stack of material of FIGS. 1 and 2 is lying directly on the ground, or on a cover sheet or base slab on the ground. In some embodiments, however, the material may be stored in an area having partial side walls ranging from four to twenty feet high, with the side walls thus forming the perimeter of the base of the stack of material. With side walls, the perimeter may be defined as rectangularly-shaped, or may take on some other shape. In any event, the cover sheet 30 extends to the perimeter of the base, and the ends of the side straps 40 must be secured relative to the ground along the side edges of the stack of material 30. Numerous securing means or "anchors" are contemplated for this purpose. The flat side straps 40 will ultimately be placed in tension so that they bear against the underlying cover sheet 30 and the material stack 20. Therefore, the side anchors, indicated generally by reference number 42, must be secured relative to the ground so that they are not dislodged and will hold the side strap 40 in place once it is drawn tight.

The necessary anchor can take several forms. If the stack of material 20 is positioned on a concrete slab or is retained against side walls (not shown), brackets could be bolted or otherwise secured to the slab or walls, with holes in the brackets for receiving the ends of the straps. Another type of anchor is a deadweight device such as a large chunk of concrete or a 55 gallon drum filled with ballast (i.e., concrete or heavy loose material). On such a deadweight device, hook or hole means would be provided for securing the ends of the straps thereto. Other anchors of this type would include old tires filled with sand or concrete, railroad ties, or just about anything massive enough to provide the necessary resistance base when the straps are placed in tension. Another alternative anchor takes the form of that shown in Double et al. U.S. Pat. No. 3,949,527, and as illustrated generally at 42 in FIG. 3. This anchor has an anchor plate 43 which is driven into the ground adjacent the edge of the stack of material 20. The anchor plate 43 is aligned with its broadest face perpendicular to the side edge, and has a connecting cable or strap 44 which is secured to the end of the side strap 40. When this side strap 40 is later tightened, the tension against the side anchor 42 pulls the broad face of the anchor plate 43 against the earth, thereby securing the anchor 42 in place and providing a firm base for the side strap 40. As seen in FIGS. 1 and 2, the side anchors are longitudinal spaced generally uniformly along the side edges of the base and are aligned in opposed lateral pairs on opposite sides of the stack of material. The pull-out resistance of such an anchor will vary depending on the circumstances, but pull-out resistances in the range of 2100 to 4000 are contemplated as suitable.

Each flat side strap 40 is laid over the cover sheet 30 and stack of material 20 so that its ends are adjacent the side anchors 42, 42 of an opposed pair of side anchors. The end of each flat side strap 40 is then secured to its respective side anchor 42. Each flat side strap 40 has a suitable buckle or tightening mechanism to pull the flat side strap 40 taunt between its respective side anchors 42, 42, over the shortest distance possible between those anchors and over the cover sheet and stack of material.

The tightening devices for each flat side strap 40 are indicated generally in the embodiment of FIGS. 1–7 by reference numeral 46. Such tightening devices 46 can take the form of simple friction buckles (like sliding belt buckles) or locking cam operated buckles such as those shown in U.S. Pat. No. 3,678,542, or for heavy duty applications, ratchet type buckles. Depending upon the application (and more specifically on the tensile strength of the involved straps, the tightening devices may be used to set a strap tension ranging from 1000 to 3000 pounds.

As is typical in such securing devices, the end of the strap 40 passes through the body of the tightening device 46 and is then passed through a loop of the cable or strap 44 secured to the anchor plate 43, the end of the strap 40 then returning to the body of the tightening device 46 to be locked into place with a loose end openly hanging therefrom, as seen in FIG. 3. In this manner, if the stack of material settles or some material is withdrawn from the stack, each strap 40 can then be readjusted and tightened down over the stack of material to retain the cover sheet 30 securely thereon.

A similar strap and anchor arrangement is provided for each end of the stack of material 20. As seen in FIGS. 1 and 2, a plurality of adjustable length, generally flat first end straps 50 are laid generally laterally over the ends of the stack of material 20 and cover sheet 30 thereon. A plurality of end anchors 52 are provided, with the end anchors longitudinally spaced generally uniformly along the end edges of the base of the stack of material 20. Typically, the end anchors are the same type of anchoring device as the side anchors. As with the side anchors 42, the end anchors are aligned in opposed lateral pairs on opposite sides of the ends of the stack of material 20. As with the side straps 40, the ends of each first end strap 50 are secured relative to the end anchors 52 of each opposed pair of end anchors and each first end strap is then tightened by a suitable tightening device 56 (like tightening device 46) down over the cover sheet 30. As seen in FIG. 2, the end straps 50 are generally longitudinally spaced and as they pass over the radial surface of the end of the stack of material 20, each first end strap 50 is aligned to run generally perpendicular to the slope of the end of the stack of material. In this manner, the first end strap 50 is placed so that it extends in the shortest distance possible over the stack of material 20 and cover sheet 30 between its opposed end anchors 52, 52. Once tightened in this alignment, the first flat strap 50 thus resists movement relative to the stack of material 20, either longitudinally or up and down the ends of the stack of material 20.

The spacing of the side and end anchors 42 and 52 is determined by the size and shape of the stack of material, in order to provide a balanced load on the covering and securing system. In one preferred embodiment, the anchors are spaced (on a center-to-center basis), with the side anchors spaced ten feet apart and the end anchors spaced twelve feet apart. In another embodiment, all anchors are spaced twenty feet apart along their respective sides of the stack of material. The spacing of anchors is generally dictated by the size of the stack of material, the nature of the material itself and the necessity for additional securing straps as conditions require (e.g. a high wind condition).

In the securing arrangement shown in FIGS. 1 and 2, one or more additional flat end straps are provided over the cover sheet 30 on the ends of the stack of material 20 adjacent the end of the crest of the stack of material. Second end straps 55 and 60 are also positioned generally laterally over each end of the stack of material adjacent the end of the crest thereof. The ends of the second end straps 55 and 60 are secured to the side anchors 42 of the first opposed pair of side anchors along each side edge of the base of the stack of material. In the same manner as the side straps 40 and first end strap 50, the second end straps 55 and 60 are also provided with tightening devices 59 and 61, respectively. As seen in FIG. 2, the second end strap 55 is also positioned over the slope of the end of the stack of material such that it is generally perpendicular to that slope, thereby traversing the shortest possible distance between the side anchors 42, 42 of the first opposed pair of side anchors. As is also apparent from FIG. 2, the side straps 40 and first and second end straps 50, 55 and 60 all extend generally laterally over the stack of material and do not cross or intersect. All straps are space longitudinally apart, with the only exception being the second end straps 55 and 60 and one of the side straps 40, all of which are connected at their ends to a common side anchor 42.

The use of flat webbing or straps to hold the cover sheet in place serves to avoid the problem with prior art systems which use cable for that purpose. The flat straps are woven material, typically 1½ inches wide or more and relatively thin. The strength of the straps varies according to the type of material being protected, the strength of the cover sheet 30 and also anticipated external weather conditions, but minimum strap tensile strengths in the range of 4600 to 9900 pounds are contemplated.

Figure 5:
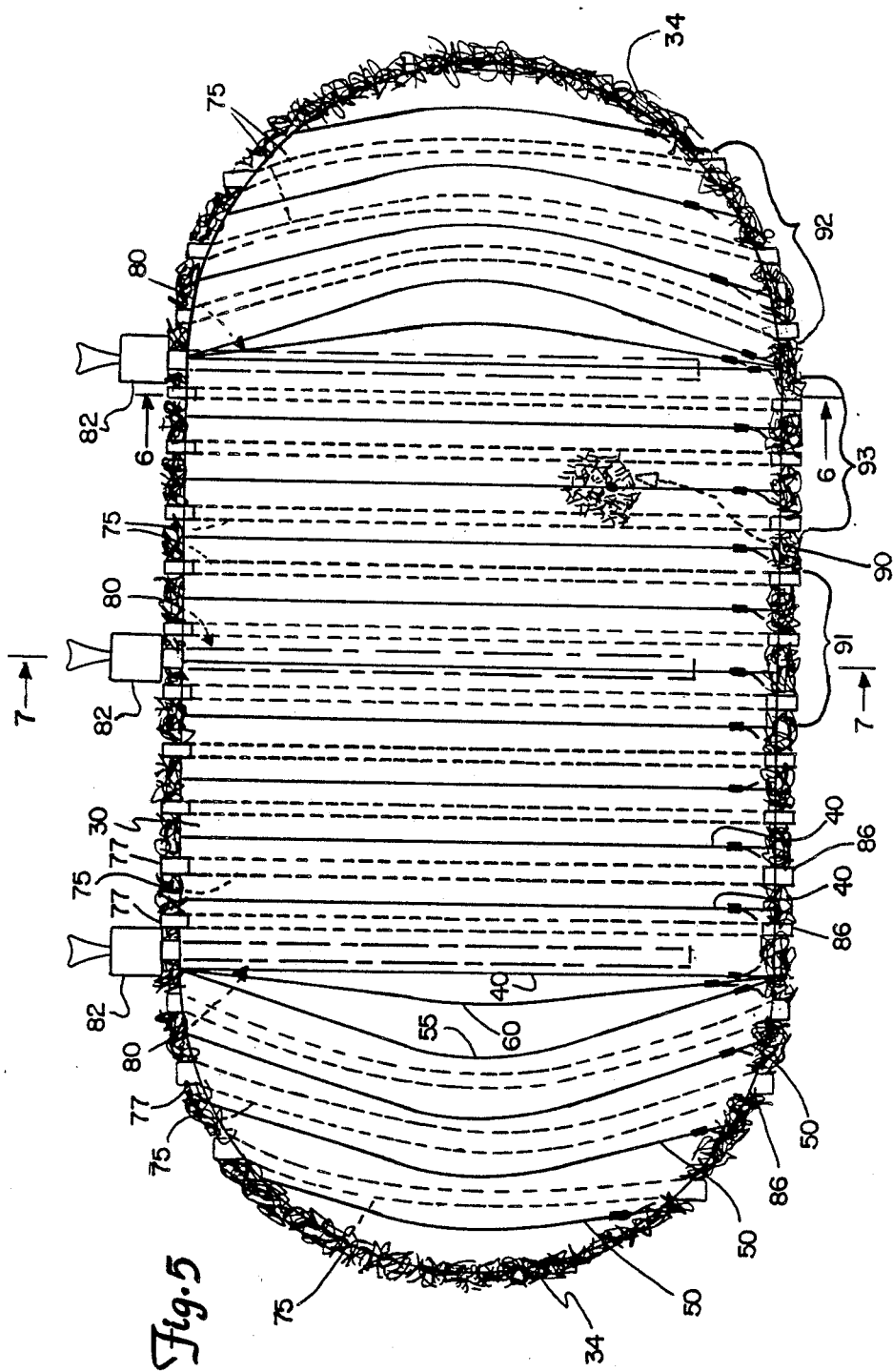
FIG. 5 is a top plan view of the covering system shown in FIG. 1, with a material areation system shown, the aeration tubes under the cover being shown in phantom.
Figure 6:
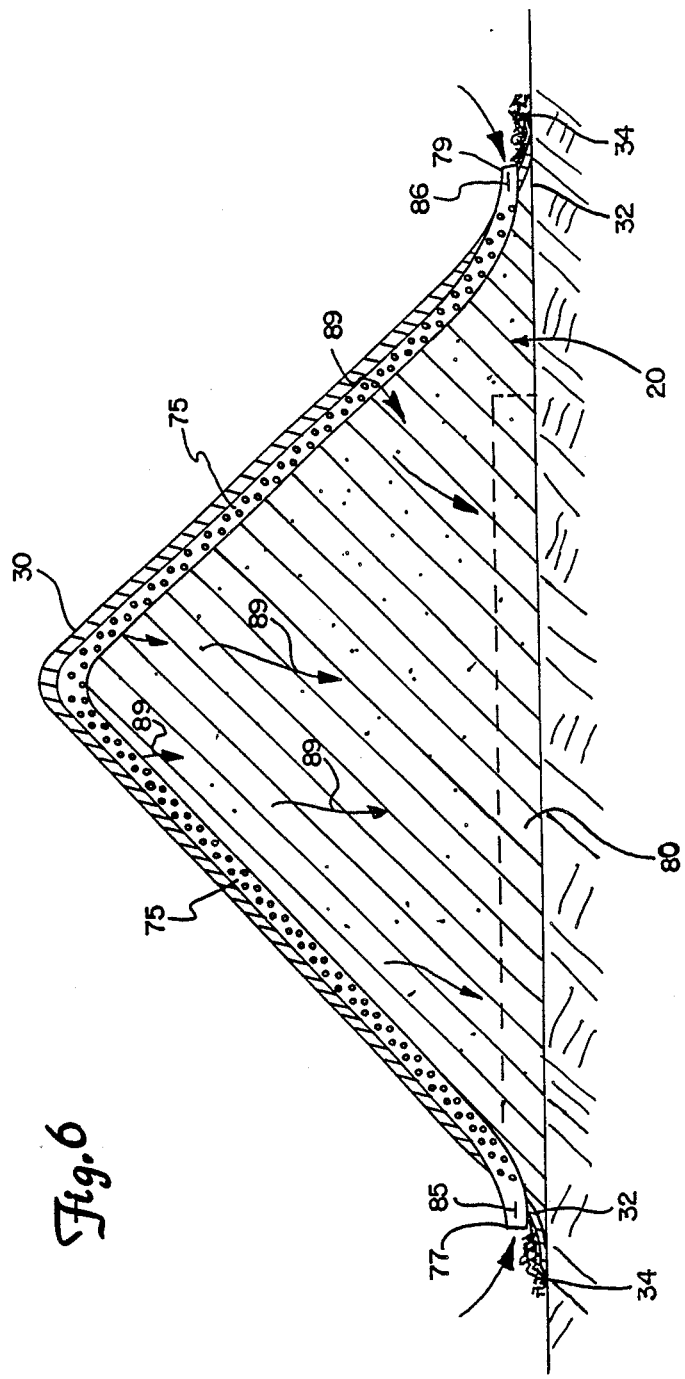
FIG. 6 is a sectional view taken along lines 6—6 in FIG. 6.
Figure 7:
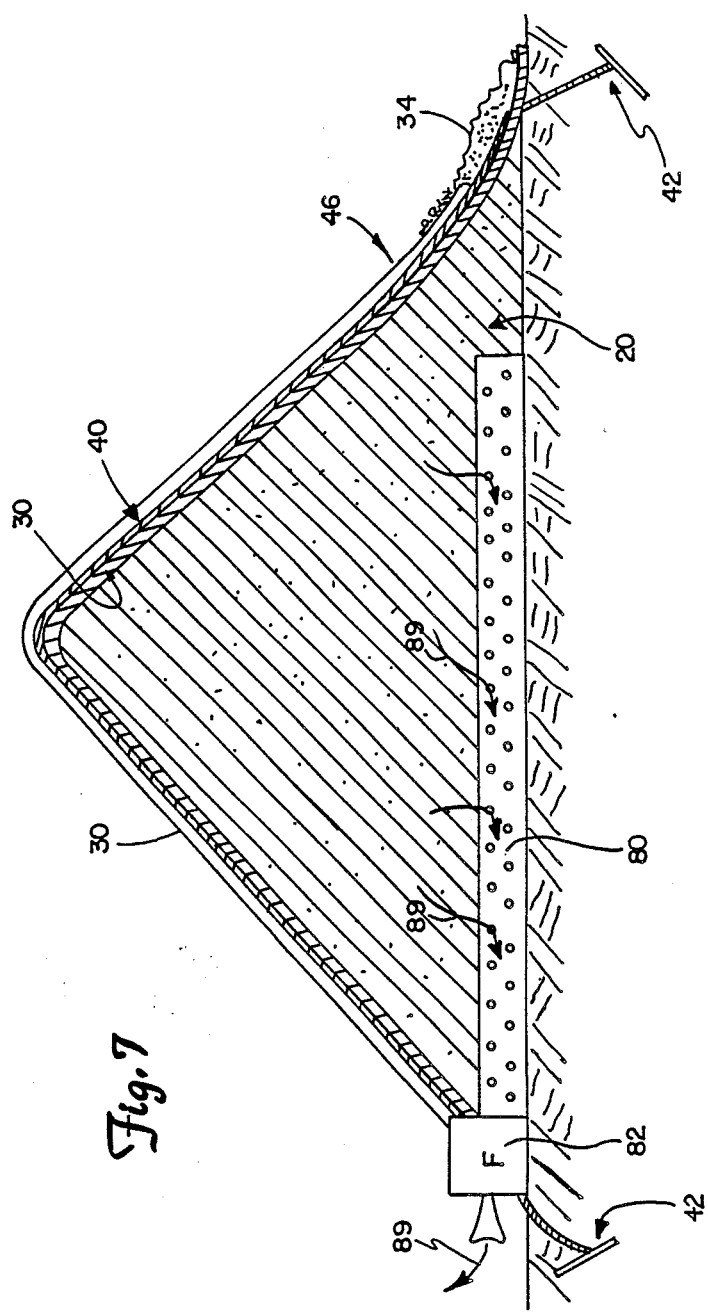
FIG. 7 is a sectional view taken along lines 7—7 in FIG. 6.

The fact that the straps do not cross or intersect is very important in certain material storage applications. For example, the temperature and humidity of stored bulk grain must be closely monitored and controlled so that the grain does not become damaged through inattention (moisture can cause fermentation and excessive heat build up in a pile of grain). For this reason, ventilation systems have been developed for large stacks of grain which are to be stored for a length of time. In the prior storage systems such as those shown in the Double et al. U.S. Pat. No. 3,949,527, the crisscrossing of cables caused a problem with any ventilation tubes or pipes laid over the stack of material and under the cover sheet. The cables rubbed against those tubes, thereby greatly enhancing the prospect of the cable cutting through the cover sheet over time. With the securing system seen in FIGS. 1 and 2, however, ventilation tubes and pipes can be laid on the top of the stack of material and aligned between the laterally extending straps, so that no strap runs over a pipe and cover sheet. This type of ventilation system is illustrated in FIGS. 4-7. As seen FIG. 4, a series of perforated areation tubes 75 are positioned under the cover sheet 30 and between adjacent lateral side straps 40. A schematic representation of a full ventilation system is seen in FIG. 5, with the upper areation tubes 75 shown in phantom between adjacent straps.

In a preferred areation system for a stack of material, a negative or suction downdraft is created with air drawn through the material stack from adjacent its sides or crest and then exhausted from adjacent the base of the stack. For illustration purposes, a ventilation system is shown in FIGS. 4-7 which include perforated intake tubes 75 and perforated outtake tubes 80. The air flow is created by activating a fan 82 secured to an external end of each outtake tubes 80, with the fan set to draw air out of the tube 80. In this arrangement, the outtake tube 80 is positioned on the ground or base prior to depositing the stack of material over the outtake tubes 80 (see FIG. 6). Once the stack has been formed, the intake tubes 75 are laid laterally over the sides of the stack of material, in generally parallel relation and across the crest thereof (see FIG. 6). Once the intake tubes 75 are so positioned, the cover sheet 30 is then laid over them and the side and end straps are secured over the cover sheet 30 as described above.

In the embodiment seen in FIGS. 4-7, the ends of the intake tubes 75 extend out through a hole in the cover sheet 30 or out from under the rim of the cover sheet 30 adjacent the base of the stack of material 20. Each intake tube 75 has a first end 77 and a second opposite end 79. The ends 77 and 79 of each intake tube 75 thus communicate with the ambient atmosphere around the stack of material 20. The intake tube 75 itself is perforated at area under the cover sheet 30 so that air drawn into the intake tube 75 can then pass through the tube walls and communicate with the stack of material 20 thereunder. Adjacent each end 77 and 79 of the intake tube 75 is a damper mechanism which is operable (either manually or automatically) to restrict or close off the flow of air through its respective end of the intake tube 75. These damper mechanisms are shown schematically in FIGS. 4 and 6 as damper mechanisms 85 and 86. As seen in FIG. 5, there are more intake tubes than out take tubes. In a preferred embodiment, each intake tube is an 8" perforated tube, while each outtake tube is a 24" perforated tube. The typical desired air flow through the stack of material is illustrated by arrows 89 in FIGS. 6 and 7. The number of intake to outtake tubes is balanced according to the desired air flow, the sizes of tubes and perforations, and the number of tubes.

By providing dampers on the ends of each intake tube 75, the flow of air through the stack of material can be closely controlled. For example, if a "hot spot" is detected in the stack of material (as indicated generally at 90 in FIG. 5), air flow can be selectively increased adjacent and through the hot spot area. In grain storage, a hot spot can occur when the grain is moist and begins fermenting, thus creating heat during the fermentation process. To slow down and stop fermentation, increased air flow causes the grain to dry. The temperature of a stack of material is monitored by temperature probes which can be inserted into the stack (preferably through resealable holes in the cover sheet).

Increased air flow adjacent the hot spot 90 seen in FIG. 5 can selectively be accomplished by shutting or restricting air flow through the groups of intake tubes indicated generally as at 91 and 92, while completely opening the dampers for the group of intake tubes indicated generally as at 93. This will direct air flow past and through the hot spot 90 as needed. Once the problem has been addressed and attended to by this modified air flow pattern, the dampers of the groups of intake tubes 91, 92 and 93 can be readjusted for uniform air flow through the stack of material 20.

Dampers are also useful for controlling the air flow when exterior weather conditions fluctuate. As mentioned, a stack of material can be several hundred feet long and up to fifty feet high. Thus, winds moving along the ground can impact a stack quite abruptly and a steady wind or gust of wind would shoot up through the ends of the intake tubes if the flow was unrestricted. When winds are extreme from one particular direction or side, the dampers can be closed on that side so that too much air is not drawn in under the cover sheet 30.

While one ventilation scheme is illustrated in FIGS. 4-7, various other schemes are also contemplated. For example, the perforated intake tubes can be replaced by air intake ports provided in the cover sheet 30 at points along the sides of the stack of material or along the crest thereof. Such ports are selectively opened and closed to allow air to be drawn in by suitable exhaust fans, such as an exhaust arrangement which draws air through the stack downwardly and then out of the stock adjacent the perimeter of the base of the stack. The key features of any ventilation system are its ability to be sealed against the elements when needed, yet opened (via controllable dampers) to allow air flow into selected portions of areas of the stack when air flow is desired.

FIGS. 8 and 9

FIGS. 8 and 9 show an alternative arrangement for employing the inventive method of the present invention. In this second alternative embodiment, the second flat end strap 60 is eliminated, and a third flat end strap 70 is provided. The third flat end strap 70 is an adjustable length, generally flat strap that is laid generally laterally over each end of the stack of material 20 adjacent its respective end of the crest thereof. The ends of the third flat end strap are secured to the side anchors 42 of the second opposed pair of side anchors extending along the side edge of the base of the stack of material 20. A tightening device 71 is provided, in similar manner to the tightening devices 46, 56 and 59 of the straps 40, 50 and 55, respectively.

Once positioned and secured adjacent its ends to the side anchors 42 of the second opposed pair of side anchors, the third flat end strap 70 is drawn taunt (by operation of its tightening device 71) to position shown in FIGS. 8 and 9, whereby the third flat end strap 70 is secured generally perpendicular to the slope of the end of the stack of material 20 adjacent the end of the crest thereof. In this manner, the third flat end strap 70 traverses the shortest possible distance across the end of the stack of material and between its respective side anchors 42, 42. In so doing, the third flat end strap 70 twice crosses the end-most side strap 40 which is secured to the first opposed pair of side anchors 42, 42 (the same pair of side anchors to which the second flat end strap 55 is secured. In a stack of material having a ventilation system such as that disclosed in FIGS. 4–7, no tube would be placed between the second and third end straps 55 and 70, nor between the two end-most generally parallel side straps 40. Thus, no strap crosses over the cover material 30 and intake tube 75 to create a situation where the strap could bind on the tube and severe the cover sheet.

When the arrangement for securing a stack of material illustrated in FIGS. 8 and 9 is used for material which need not be areated, then the cross-over of straps is not a concern. In addition, in such an arrangement, a flat crest strap 90 may be secured to each of the lateral side straps 40 adjacent the crest of the stack of material 20 to provide additional stability for the covering system. The flat crest strap 90 would preferably be formed from the same material as the other straps, and would be attached to the existing straps by suitable means, such as sewing or suitable mechanical fasteners.

FIGS. 10 and 11

FIGS. 10 and 11 show a third preferred embodiment for employing the inventive method of the covering system of the present invention. For ease of reference, components corresponding to those identified with respect to the first preferred embodiment shown in FIGS. 1-7 are referred to by reference numbers 100 higher than those previously used. For example, the cover sheet is cover sheet 130, the first end straps are referred to as first end straps 150, and they are secured at their ends to end anchors 152. This arrangement is designed for covering material which need not be areated and thus would have no areation tubes or other areation equipment between the cover sheet 130 and stack of material thereunder. As such, the maintenance of lateral sections of the cover sheet without longitudinally crossing straps is not necessary. Since the straps do not cross over areation tubes or other equipment laying on the stack of material and under the cover sheet 130, rubbing of the straps against such tubes or equipment (and its resultant tearing of the cover sheet) is not a problem.

As seen in FIGS. 10 and 11, therefore, the primary side straps are not maintained in a parallel alignment as they run laterally over the sides and crest of the stack of material, but rather run in crisscross fashion over the stack of material. These crisscrossing flat side straps, designated as flat side straps 145, intersect as they cross the crest of the stack of material. Each flat side strap 145 has one end secured to a side anchor 142 on a first side of the stack of material and has its other end secured to a longitudinally next adjacent side anchor 142 on the second side of the stack. As mentioned, the flat side straps 145 are each adjustable in length, having a tightening device 147 similar in nature to those tightening devices previously described with respect to flat side straps 40. Thus, once the crisscross side straps 145 are positioned as illustrated in FIGS. 10 and 11 across the sides and crest of the stack of material, each side strap 145 is individually drawn taunt and down upon the cover sheet 130 and stack of material by manipulation of its tightening device 147.

In addition to the lateral crisscross side straps 145, the arrangement seen in FIGS. 10 and 11 also preferably includes lateral straps 140 proximate the end of the central windrow section of the stack of material, with the side straps 140 extending generally straight across the stack of material, up and over the crest at the end of the crest thereof. Each side strap 140 is thus secured to the first pair of opposed side anchors 142 at each end of the sides of the stack of material. In addition, for additional stability and security, a flat crest strap 190 is secured to the side straps 140 and 145, and extends longitudinally along the crest of the stack of material. Crest strap 190 is secured by suitable means, such as sewing or other mechanical fasteners, to the side straps 140 and crisscrossing side straps 145 proximate the crest. This arrangement for securing a stack of material also includes at least one second flat end strap 155 extending between the first opposed pair of side anchors 142, 142 and also includes a third end strap 170 which is secured to the second opposed pair of side anchors 142, 142, in the manner similar to that shown and discussed in relation to FIGS. 8 and 9. As readily seen in FIG. 11, the end straps 150, 155 and 170 are again aligned to extend across the end of the stack of material so that the straps are generally perpendicular to the slope of the stack and thus traverse the shortest possible distance between the end or side anchors therefor.

Although the present invention has been described with reference to preferred embodiments, workers skilled in the art will recognize that changes may be made in form and detail without departing from the spirit and scope of the invention.

What is claimed is:

1. A method of covering and securing to the ground a generally windrow-shaped stack of material which has a longitudinal crest having first and second ends, a base having a perimeter defined by a pair of generally parallel side edges and a pair of generally semi-circularly shaped end edges, longitudinal sides sloping downwardly and laterally outwardly from the crest toward the side edges of the base, and first and second ends sloping downwardly and radially outwardly from each respective end of the crest toward the end edges of the base, the method comprising the steps of:

(a) covering the entire surface of the stack with a flexible cover sheet having a rim portion;

(b) extending the rim portion of the cover sheet along the ground surface surrounding the stack of material;

(c) laying ballast material over substantially the entire length of the rim portion of the cover sheet to force the rim portion into generally abutting engagement with the ground to prevent the influx of wind and moisture;

(d) establishing a plurality of side anchors with respect to the ground, with the side anchors longitudinally spaced generally uniformly along the side edges of the base and aligned in opposed lateral pairs on opposite sides of the stack of material;

(e) laying a plurality of adjustable length, generally flat side straps laterally over the sides of the stack of material, in generally parallel relation and across the crest thereof;

(f) securing the ends of each flat side strap to the side anchors of a respective one of each of the opposed pairs of side anchors;

(g) shortening the length of each flat side strap to tighten the flat side strap down onto the cover sheet over the sides and crest of the stack of material;

(h) establishing a plurality of end anchors with respect to the ground with the end anchors longitudinally spaced generally uniformly along the end edges of the base and aligned in opposed lateral pairs on opposite sides of the ends of the stack of material;

(i) laying a plurality of adjustable length, generally flat first end straps generally laterally over the ends of the stack of material;

(j) securing the ends of each flat first end strap to the end anchors of a respective one of each of the opposed pairs of end anchors;

(k) shortening the length of each flat first end strap to tighten the flat first end strap down onto the cover sheet over the ends of the stack of material;

(l) laying at least one adjustable length, generally flat second end strap generally laterally over each end of the stack of material adjacent its respective end of the crest of the stack of material;

(m) securing the ends of each flat second end strap to the side anchors of the first opposed pair of side anchors along each side edge of the base; and (n) shortening the length of each flat second end strap to tighten the flat second end strap down onto the cover sheet over the end of the stack of material adjacent its respective end of the crest of the stack of material.

2. The method of claim 1, and further comprising the steps of:

(o) laying at least one adjustable length, generally flat third end strap generally laterally over each end of the stack of material adjacent its respective end of the crest of the stack of material;

(p) securing the ends of each flat third end strap to the side anchors of the second opposed pair of side anchors along each side edge of the base; and (q) shortening the length of each flat third end strap to tighten the flat third end strap down onto the cover sheet over the end of the stack of material adjacent its respective end of the crest of the stack of material whereby the flat third end strap twice crosses at least one of the flat side straps.

3. The method of claim 1 wherein a pair of flat second end straps are provided at each end of the stack, with the flat second end straps of each pair being spaced longitudinally once tightened over the cover sheet at all points except adjacent the ends of the two flat second end straps of the pair.

4. The method of claim 1, and further comprising the steps of:

(o) providing means for creating a down draft airflow through the stack of material from its sides toward its base;

(p) laying a plurality of perforated side areation tubes laterally over the sides of the stack of material, in generally parallel relation and across the crest thereof, prior to covering the stack of material with the cover sheet; and (q) laying the flat side straps over the cover sheet so that at least one side areation tube extends between each pair of adjacent flat side straps.

5. The method of claim 4, and further comprising the step of:

(r) extending the ends of each side areation tube out from under the cover sheet proximate the side edges of the base; and (s) selectively restricting the airflow though each end of each side areation tube.

6. The method of claim 4, and further comprising the steps of:

(r) laying a plurality of perforated end areation tubes generally laterally over the ends of the stack of material, prior to covering the stack of material with the cover sheet; and (s) laying the flat first end straps over the cover sheet so that at least one end areation tube extends between each pair of adjacent flat end straps.

7. The method of claim 6, and further comprising the steps of:

(t) extending the ends of each end areation tube out from under the cover sheet proximate the end edges of the base; and (u) selectively restricting the airflow through each end of each end areation tube.

8. A method of covering and securing to the ground a generally windrow-shaped stack of material which has a longitudinal crest having first and second ends, a base having a perimeter defined by first and second generally parallel side edges and a pair of generally semi-circularly shaped end edges, longitudinal sides sloping downwardly and laterally outwardly from the crest toward the side edges of the base, and first and second ends sloping downwardly and radially outwardly from each respective end of the crest toward the end edges of the base, the method comprising the steps of:

(a) covering the entire surface of the stack with a flexible cover sheet having a rim portion;

(b) extending the rim portion of the cover sheet along the ground surface surrounding the stack of material;

(c) laying ballast material over substantially the entire length of the rim portion of the cover sheet to force the rim portion into generally abutting engagement with the ground to prevent the influx of wind and moisture;

(d) establishing a plurality of side anchors with respect to the ground, with the side anchors longitudinally spaced generally uniformly along the side edges of the base and aligned in opposed lateral pairs on opposite sides of the stack of material;

(e) laying a plurality of adjustable length, generally flat side straps laterally over the sides of the stack of material and across the crest thereof;

(f) securing a first end of each flat side strap to a respective side anchor of each opposed pair of side anchors, along the first side edge of the base;

(g) securing a second end of each first flat side strap to a respective side anchor on the second side edge of the base which is next adjacent to the side anchor on the second side edge that is aligned in opposed lateral pairing with the side anchor on the first side edge to which the first end of the first flat side strap is secured, with longitudinally adjacent flat side straps crossing each other proximate the crest of the stack of material;

(h) shortening the length of each flat side strap to tighten the flat side strap down onto the cover sheet over the sides and crest of the stack of material;

(i) establishing a plurality of end anchors with respect to the ground with the end anchors longitudinally spaced generally uniformly along the end edges of the base and aligned in opposed lateral pairs on opposite sides of the ends of the stack of material;

(j) laying a plurality of adjustable length, generally flat first end straps generally laterally over the ends of the stack of material;

(k) securing the ends of each flat first end strap to the end anchors of a respective one of each of the opposed pairs of end anchors;

(l) shortening the length of each flat first end strap to tighten the flat first end strap down onto the cover sheet over the ends of the stack of material;

(m) laying at least one adjustable length, generally flat second end strap generally laterally over each end of the stack of material adjacent its respective end of the crest of the stack of material;

(n) securing the ends of each flat second end strap to the side anchors of the first opposed pair of side anchors along each side edge of the base; and (o) shortening the length of each flat second end strap to tighten the flat second end strap down onto the cover sheet over the end of the stack of material adjacent its respective end of the crest of the stack of material.

9. The method of claim 8, and further comprising the steps of:

(p) laying at least one adjustable length, generally flat third end strap generally laterally over each end of the stack of material adjacent its respective end of the crest of the stack of material;

(q) securing the ends of each flat third end strap to the side anchors of the second opposed pair of side anchors along each side edge of the base; and (r) shortening the length of each flat third end strap to tighten the flat third end strap down onto the cover sheet over the end of the stack of material adjacent its respective end of the crest of the stack of material whereby the flat third end strap twice crosses at least one of the flat side straps.

10. The method of claim 8 wherein a pair of flat second end straps are provided at each end of the stack, with the flat second end straps of each pair being spaced longitudinally once tightened over the cover sheet at all points except adjacent the ends of two flat second end straps of the pair.

11. The method of claim 8, and further comprising the steps of:

(p) securing a longitudinally extending flat crest strap to the flat side straps along the crest of the stack of material.

* * * * *